July 4, 1961 J. J. PASCALL 2,990,679
BAND OF DETACHABLE SHEET METAL LINKS AND THE LINK
Filed May 28, 1958
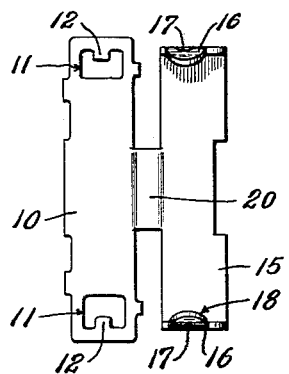
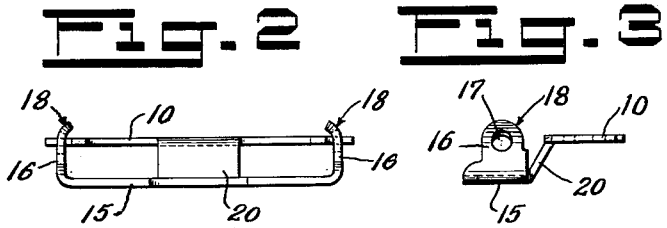
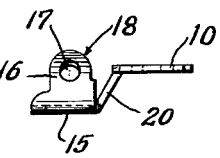
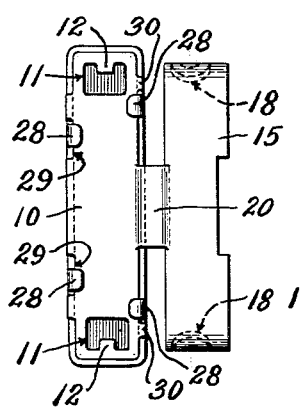
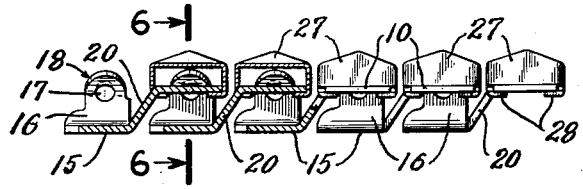
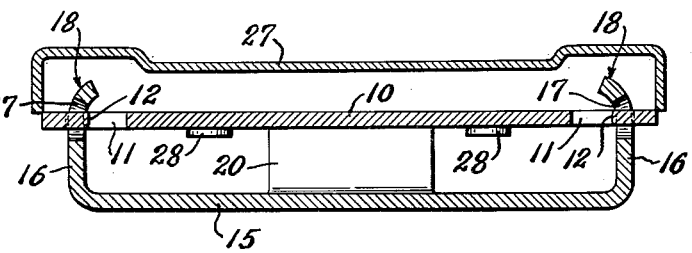
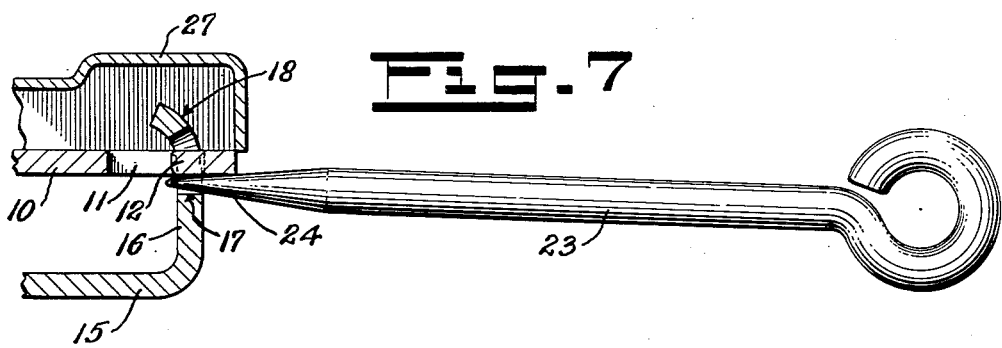
INVENTOR.
JOSEPH J. PASCALL
BY
ATTORNEYS 2,990,679
BAND OF DETACHABLE SHEET METAL LINKS
AND THE LINK
Joseph J. Pascall, Westport, Conn., assignor to Lenox Jewelry Products Corporation, New York, N.Y., a corporation of New York
Filed May 28, 1958, Ser. No. 738,383
7 Claims. (Cl. 59—80)

This invention relates to a flexible or bendable band which may serve as a simple bracelet or serve as a wristband for a wristwatch. More particularly it relates to a flexible band which is bendable but not extensible and any lengthwise extensibility would be secured by a section having this capability. The invention also relates to the form of the link. The link is one which is connectable with identical links by flexing attaching arms or projections onto the adjacent link. The links may be similarly separated so that one or more links may be separated from the series of links forming the wristband to shorten the same or added to the series of links to lengthen the band.

It is an object of the invention to construct a flexible or bendable band of a series of links utilizing a single form of link one or more of which are quickly and easily interconnected together or disconnected.

Another object of the invention is to construct a flexible band utilizing a single form of link.

Another object of the invention is to construct a link which can be snapped attached or snapped disconnected from like links.

Other objects of the invention will be more apparent from the following description when taken in connection with the accompanying drawings illustrating a preferred embodiment thereof in which:

FIG. 1 is a top view of the link;

FIG. 2 is a side view of the link;

FIG. 3 is an end view of the link;

FIG. 4 is a view of the link on the reverse side of that of FIG. 1 and with a decorative shell secured thereto;

FIG. 5 is a portion of the band with a series of links interconnected together with a portion thereof in section;

FIG. 6 is an enlarged section through two assembled links taken on line 6—6 of FIG. 5; and FIG. 7 is an enlarged view of the interconnecting end of two links and showing a tool used and manipulated for securing separation of a link.

The link for making up a wristband includes a tongue or pivot portion or part 10, shown as rectangular, having a length corresponding with the desired width of the band and having a pair of spaced longitudinal edges. The link particularly shown has a pair of spaced holes 11 illustrated particularly at each end thereof. A tongue or pivot 12 projects into each hole from an outer or inner longitudinal edge thereof. The tongues or pivots are preferably on the outer edge of its hole so that the tongues or pivots project inwardly or towards each other. The longitudinal edges of the pivot hole are those opposite edges which extend in a longitudinal direction of the band. The two tongues or pivots may project from the outer or inner edges of its respective pivot hole.

The link also includes a rectangular bearing portion or part 15 having a pair of projecting arms 16 spaced apart a distance approximately corresponding with the spacing of the pivots and shown particularly on each end thereof. These arms are bent upwardly and are resilient that is each arm can be flexed inwardly as will appear hereinafter. The resiliency of each arm is secured by its length, width and the thickness of the sheet material used from which the link is punched. Each arm has a hole 17 therein of a size to receive a tongue or pivot 12 or a little larger. With the hole 17 being round the tongue or pivot may have pivotal movement therein so that the hole then provides a bearing hole and the links have more or less pivotal movement with respect to each other. The outer end of each arm is also bent to form a camming surface 18 the bend being inwardly when the pivots extend inwardly as shown. The pivot portion or part 10 is connected with the bearing portion or part 15 by means of an angular portion which is also shown as a relatively narrower neck 20 centrally between the adjacent edges of each part. The connecting neck is bent so that the two parts are in spaced parallel planes. Spacing of the planes is such that the bearing hole 17 of each arm of the bearing part 15 is in the same plane as the pivot 12 of the pivot part 10. The two portions are also spaced laterally with respect to each other so that attached links will have more or less freedom to pivot one on the other. The link is punched from sheet material and then bent into the form illustrated with the two portions or parts in spaced parallel planes and the arms 16 bent so as to bring the bearing hole 17 into the same plane as the pivot or tongue carried by the pivot portion or part which with the pivots in the plane of its portion brings the bearing holes into the plane of the pivot part. The pair of spaced bearing holes on the link are spaced apart corresponding to the spacing of the pivots or tongues 12.

In attaching two like or identical links together, the second link has the bearing hole 17 inserted on its mating pivot 12 and by pressing the pivot portion and the bearing portion together at the other end, the camming surface 18 engages the end of the other pivot 12 and presses or flexes the arm 16 or indeed may press or flex both arms inwardly because of the resiliency or flexibility of the arms so that the pivot hole 17 is pressed into alignment with its mating pivot 12 whereupon the arm or arms flex apart and secures the second link upon the first link. The two links are, therefore, attached together against inadvertent separation and one link can pivot on the other link through the pivot means provided by the pivot 12 and the pivot hole 17.

If it should be desired to remove one or more links in order to shorten the band, a tool 23 may be used having a pointed end 24. The pointed end may be anchored in the hole 17 by at least partially entering the same whereupon pressure on the tool flexes this arm or both arms 16 inwardly until the pivot hole 17 clears the pivot 12 and may be removed therefrom. The pivot at the other end is then separated from its pivot hole and the two links are quickly and easily disassembled.

The decorative aspect of the bracelet or band may be improved by fastening a shell 27 on the pivot part 10. The shell is suitably fixed to the pivot part, the means particularly shown are bendable ears 28 carried by the edges of the shell which are bent over the other side of the pivot portion. In order to more definitely anchor the shell to the pivot portion, a recess 29 may be provided in the edge of the pivot portion and lugs 30 on the other edge also aid in preventing displacement of the shell on the pivot part. Since the pivot portion of the next adjacent link assembles over the bearing part 15, the pivot parts and their shells are adjacent to each other as shown in FIGURE 5, but spaced apart a short distance so that they will not interfere with pivoting of one link with respect to the other. The shell is box like or five sided in form or hollow so that the projecting ends of the arms are received within the shell and are also concealed by the shell in an inward direction on a person's wrist.

The first and last links are terminated by any suitable means such as for attaching one or more elastic or stretchable links or to easily attach the ends of the band together or to attach the ends to a watch and the like. The end links may be fastened together without more to form a continuous band. The entire link is punched from sheet material so that all parts are integral.

This invention is presented to fill a need for improvements in a wristband and the like. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A band comprising a plurality of identical one piece links secured together, each link including a flat tongue portion having opposite ends constituting spaced longitudinal side portions of the link, said side portions including a pair of spaced longitudinal edges, a tongue extending from each longitudinal edge, each link including a flat bearing portion having its ends bent at right angles thereto and forming resilient arms spaced apart approximately the same distance as the tongues, means integrally connecting the tongue and bearing portions together in parallel spaced planes and in adjacent edgewise relation, and each resilient arm extending toward and beyond the plane of said tongue portion, each arm having a bearing hole therethrough and in alignment with the plane of the tongues, and the bearing holes in the arms of each link having the tongues of the adjacent link therein with the tongue portion of one link overlying the bearing portion of the next link.

2. A flexible band comprising a plurality of identical one piece links secured together, each link including a pivot portion having spaced pivot holes therein each with inner and outer edges and a longitudinal dimension, a pivot extending into each pivot hole from a corresponding one of its edges, each link including a bearing portion having ends bent at right angles thereto and forming resilient arms spaced apart approximately the same distance as the pivots and having width, the longitudinal dimension of each pivot hole in the pivot portion being greater than the width of the arm of a second link received therein, means integrally connecting the pivot portion and bearing portion together in parallel spaced planes and in adjacent edgewise relation, and each resilient arm having a bearing hole therethrough and in alignment with the plane of the pivot portion, and the bearing holes in the arms of each link having the pivots of the adjacent link therein with the tongue portion of one link overlying the bearing portion of the next link.

3. A flexible band as in claim 2 including a hollow shell attached to the pivot portion and extending away from the bearing portion, and the hollow shell of one link being adjacent to the hollow shell of the next link to restrict pivoting of the links in an outward direction.

4. A flexible band as in claim 2 in which each pivot is on the outer edge of its pivot hole.

5. A one-piece link for a band comprising a flat tongue portion having opposite ends constituting spaced longitudinal side portions of the link, said side portions including a pair of spaced longitudinal edges, a tongue extending from each longitudinal edge, said tongues having free ends and being in lateral alignment, a flat bearing portion having resilient arms spaced apart laterally approximately the same distance as the tongues and extending upwardly at right angles from the bearing portion, each resilient arm being in longitudinal alignment with a tongue, means integrally connecting the tongue and bearing portions together in spaced parallel planes and spaced longitudinally of the link in adjacent edgewise relation, and each resilient arm having a bearing hole therethrough of a diameter to pivotally receive a tongue of a second identical link and the bearing holes being in alignment in a horizontal plane through the tongues, said tongues and said bearing holes extending transversely of the link, and each tongue having a length to provide a pivot when assembled in the bearing hole of a like link.

6. A link for a band as in claim 5 including a bend on the end of each arm providing a camming surface.

7. A link for a band as in claim 5 in which the tongue portion has a pair of spaced tongue holes providing pairs of inner and outer spaced longitudinal edges, and the tongues extend towards each other from the outer pairs of longitudinal edges.

References Cited in the file of this patent

UNITED STATES PATENTS

| 948,917 | Boyland | Feb. 8, 1910 |
|---|---|---|
| 1,788,552 | Speidel | Jan. 13, 1931 |
| 2,699,035 | Becker | Jan. 11, 1955 |
| 2,791,868 | Viken | May 14, 1957 |
| 2,848,865 | Napoli et al. | Aug. 26, 1958 |

FOREIGN PATENTS

| 604,222 | France | Jan. 22, 1926 |
|---|---|---|
| 1,141,005 | France | Mar. 11, 1957 |

UNITED STATES PATENT OFFICE

CERTIFICATE OF CORRECTION

Patent No. 2,990,679                                         July 4, 1961

Joseph J. Pascall

It is hereby certified that error appears in the above numbered patent requiring correction and that the said Letters Patent should read as corrected below.

Column 2, line 67, strike out "in an inward direction on a person's wrist" and insert the same after "other" and before the period in line 64, same column.

Signed and sealed this 14th day of November 1961.

(SEAL)
Attest:

ERNEST W. SWIDER                                  DAVID L. LADD
Attesting Officer                                     Commissioner of Patents

USCOMM-DC